| | | |
|---|---|---|
| United States Patent [19] | [11] | 4,261,876 |
| Reusser | [45] | Apr. 14, 1981 |

[54] POLYSILICONES-POLYBUTADIENEDIOL BLENDS AS RELEASE COATINGS

[75] Inventor: Robert E. Reusser, Bartlesville, Okla.

[73] Assignee: Phillips Petroleum Company, Bartlesville, Okla.

[21] Appl. No.: 954,159

[22] Filed: Oct. 24, 1978

[51] Int. Cl.$^3$ .............................................. C08L 83/06
[52] U.S. Cl. ........................... 260/33.6 SB; 428/447; 525/105; 525/478; 525/479
[58] Field of Search ............... 428/447; 260/825, 827, 260/33.6 SB; 525/105, 478, 479

[56] References Cited

U.S. PATENT DOCUMENTS

| | | | |
|---|---|---|---|
| 2,869,722 | 1/1959 | Marander et al. | 260/827 |
| 3,108,994 | 10/1963 | Zelinski et al. | 526/335 |
| 3,135,716 | 6/1964 | Uraneck et al. | 525/334 |
| 3,157,604 | 11/1964 | Strobel | 252/431 |
| 3,175,997 | 3/1965 | Hsieh | 525/385 |
| 3,419,508 | 12/1968 | Grenoble | 260/825 |
| 3,428,580 | 2/1969 | Nitzsche et al. | 260/825 X |
| 3,518,325 | 6/1970 | Campbell et al. | 260/18 S |
| 3,565,838 | 2/1971 | Atkinson et al. | 260/18 S |
| 3,575,917 | 4/1971 | Kapral | 260/33.6 |
| 3,628,996 | 12/1971 | Weber | 260/825 X |
| 3,655,598 | 4/1972 | Antonen et al. | 260/18 S |
| 3,679,458 | 7/1972 | Sorell | 206/59 |
| 3,897,376 | 7/1975 | Lampe | 260/825 X |
| 3,936,582 | 2/1976 | Keiser | 428/447 |

*Primary Examiner*—Wilbert J. Briggs, Sr.
*Attorney, Agent, or Firm*—Paul L. Gomary

[57] ABSTRACT

A release coating composition for use with, for example, adhesive tapes, comprising a low release strength silicone-based polymer, a high release strength silicone-based polymer, a metal salt of a carboxylic acid, and a dihydroxyterminated polymer of a conjugated diene. The relative amounts of high release strength silicone-based polymer and dihydroxyterminated polymer of a conjugated diene can be varied to give varying release force strengths of the respective coating compositions.

13 Claims, No Drawings

POLYSILICONES-POLYBUTADIENEDIOL BLENDS AS RELEASE COATINGS

This invention relates to a release coating composition. In one of its aspects it relates to such a composition suited for use with adhesive tapes. In another of its aspects the invention relates to such a composition the release strength of which can be varied by varying the constituents of the composition.

In one of its concepts the invention provides a release agent or composition, suitable for use with adhesive tapes, comprising a low release strength silicone-based polymer, a high release strength silicone-based polymer, a metal salt of a carboxylic acid, and a dihydroxyterminated polymer of a conjugated diene. In another of its concepts the invention provides such a composition wherein the amounts of high release strength silicon-based polymer and the dihydroxy-terminated polymer of a conjugated diene can be varied to given varying release force strengths of the respective coating compositions thus produced.

The release coating compositions of this invention are characterized by their ability to retain the desired release strength even upon rubbing with another material to simulate handling, and by the wide range of release force strength values available.

Release agents referred to as parting agents or adherents are solid or liquid films that reduce or prevent adhesion between two surfaces. Despite their recent origin, the silicones represent the most important class of release agents. The commercially useful silicone-based release agents are polymers in order to obtain high boiling points and, therefore, low volatility at room temperature, heat resistancy and resistance to oxidation. In addition, silicones have low surface energy that reduces adhesion, increases chemical and physiological inertness and are generally colorless and nonstaining. Silicone resins are generally low molecular weight chemical intermediates that are further reacted or cured by heat and catalyst to given them their outstanding features as release agents.

Industrial fields in which release agents have attained great importance include metal castings and processing, food preparation and packaging, rubber and polymer processing, paper coating, the production of pressure-sensitive tapes, and glass fabrication. Some industries which are of importance today could not have developed without the availability of modern release agents. As an example, the pressure sensitive tapes could not be unwound if the backing were not coated with a release agent. The amount of release force necessary is, therefore, as widely varied as the types of application in which the release agents are used. Because of this, manufacturers desire the flexibility to vary release forces, upon customer demand, by merely changing concentrations of components of whatever formulation being used rather than adding additional or alternate ingredients which means changing types of feeds, providing other storage containers and possibly increasing human error in the extra handling.

It is an object of this invention to provide a release coating composition. It is another object of this invention to provide such a composition the release strength of which can be varied. It is a further object of the invention to provide such a composition which, when applied, will have an ability to retain the desired release strength even after rubbing with another material or as in handling.

Other aspects, concepts and objects of the invention are apparent from a study of this disclosure and the appended claims.

According to the present invention there is provided a release coating composition comprising a low release strength silicone-based polymer, a high release strength silicone-based polymer, a metal salt of a carboxylic acid, and a dihydroxyterminated polymer of a conjugated diene.

Further, according to the invention, by varying the relative, and total, quantities of the high-release strength silicone-based polymer and the dihydroxyterminated polymer of the conjugated diene the release force strengths of the coating composition can be varied to suit the particular application for which the composition is desired.

A. Low Release Strength Silicone-Based Polymer

The low release strength silicone-based polymer useful in this invention is comprised of a mixture of (1) a high weight average molecular weight polymethyldihydroxysiloxane and (2) a low weight average molecular weight polymethylhydrosiloxane. The high molecular weight ingredient will be present in an amount of about 97 wt. %. The low molecular weight ingredient will correspondingly be present in an amount of about 3 wt. %. Ingredients (1) and (2) are operable in the range of from about 90 to about 99 wt. % of the high molecular weight ingredient and 10-1 wt. % of the low molecular weight ingredient.

(1) High Weight Average Molecular Weight Polymethyldihydroxysiloxanes

The polymethyldihydroxysiloxanes useful in this invention are substantially linear dimethylsiloxane polymers in which the terminal silicon atoms of the polymer molecules have directly attached thereto hydroxyl radicals. Such polymers are generally represented by the general formula

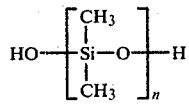

wherein n represents the number of repeating units in the polymer chain and is generally in the range of from about 1,000 to about 5,000. Thus, the polymer molecules generally contain an average of about two hydroxyl groups per molecule located at or near the termini.

(2) Low Weight Average Molecular Weight Polymethylhydrosiloxanes

The polymethylhydrosiloxanes useful as crosslinkers, crosslinked by the catalyst, in this invention are substantially linear siloxane polymers in which some of the silicon atoms have hydrogen atoms bonded thereto, the remaining valencies of the silicon atoms being satisfied with methyl radicals or with oxygen atoms forming the —OSiOSiOSi— linkages within the siloxane chain. Thus, the operable polymethylhydrosiloxanes are represented by the general formula

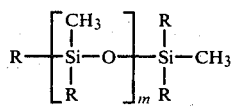

wherein R is hydrogen or a methyl radical, m refers to the number of repeating units in the polymer chain and is generally in the range of from about 25 to about 100, with the further proviso that at least 25 percent of the R groups are hydrogen and preferably from about 50 to 100 percent of the R groups are hydrogen with the remainder thereof being methyl radicals.

B. High Release Strength Silicone-Based Polymer

The silicone-derived polymers also referred to as silicates and useful in this invention are obtained by hydrolysis and trimethylsilylation of alkali metal silicates or tetraalkyl silicates. The material used was C4-2109 (Dow Corning).

A preferred method of preparation of the silicate-derived polymer involves the hydrolysis of sodium silicate with aqueous acid, for example, hydrochloric acid, and subsequent treatment of the hydrolyzed silicate with trimethylchlorosilane to give a hydrophobic polymer which generally contains less than 2 weight percent hydroxyl groups based upon the total weight of the trimethylsilylated polymer.

An alternative means of preparing the silicate-derived polymer involves the co-hydrolysis of trimethylchlorosilane and a tetraalkyl silicate of formula $(R'O)_4Si$ wherein the R's are independently selected from alkyl radicals of 1-6 carbon atoms per radical. When co-hydrolyzing trimethylchlorosilane with a tetraalkyl silicate, it is necessary to add a small amount of an acid such as hydrochloric acid to effect hydrolysis and intercondensation or co-condensation. The amount of trimethylchlorosilane employed in the cohydrolysis will vary from substantially less than the stoichiometric amount to slightly less than the stoichiometric amount depending upon the amount of hydroxyl groups desired in the resultant polymer.

The co-hydrolysis of trimethylchlorosilane and tetraalkyl silicate is relatively simple and merely requires addition of the trimethylchlorosilane and tetraalkyl silicate to a suitable solvent, such as toluene, benzene, xylene, etc., and thereafter addition of the solution of the ingredient to a sufficient amount of aqueous acid to effect the desired hydrolysis and co-condensation. The amount of water employed for hydrolysis purposes is generally not critical and may be varied within wide ranges.

For the release coatings of the present invention it is generally preferable to employ silicate-derived polymers in a weight average molecular weight range of from about 3,000 to about 10,000 and preferably from about 4,000 to about 6,000.

C. Hydroxy Terminated Polymers

Hydroxy terminated polymers useful in this invention are generally liquid or semi-liquid polymers having weight average molecular weights in the range of 1,000 to about 20,000 represented by the general formula

HO—R"—OH wherein R" is derived from polymerization of any conjugated diene such as 1,3-butadiene or isoprene. Generally these hydroxy terminated polymers are prepared by reacting an alkali metal such as lithium or sodium with an organic material containing at least one double such as naphthalene to give a dilithionaphthalene initiator. A conjugated diene such as butadiene or isoprene is then polymerized in the presence of the initiator followed by the addition of an alkylene oxide or oxygen and acid hydrolysis to the diol. The preparation of these type materials is generally described in U.S. Pat. Nos. 3,175,997; 3,108,994; 3,135,716; and 3,157,604. The products are generally clear to amber colored and can have 5 to 50% but preferably 15 to 30% vinyl unsaturation. The disclosure of the patents are incorporated herein by reference.

D. Catalysts

The catalysts useful in the preparation of the inventive release coatings are generally metal salts of carboxylic acids. Examples of metals which may be used are lead, tin, nickel, cobalt, iron, cadmium, chromium, zinc and the like. The tin salts are generally preferred. Examples of suitable catalysts are dibutyltin diacetate, dibutyltin dilaurate, dibutyltin di-(2-ethylhexanoate), dioctyltin diacetate, tributyltin acetate, dioctyltin maleate, cobalt naphthenate, chromium octanoate, and the like. Dibutyltin diacetate is a preferred catalyst for the inventive release coating.

The catalyst promotes crosslinking between the low molecular weight polymethylhydrosiloxanes ingredient of the present invention and hydroxy containing polymer such as the high molecular weight polyhydroxysiloxanes described herein. The liquid hydroxy terminated conjugated diene polymer ingredient described herein may also be incorporated during the crosslinking operation.

E. Solvent

Various organic solvents may be utilized as the liquid medium for applying the inventive release coatings to the desired substrates. Examples of these solvents are aliphatic hydrocarbons such as pentane, neopentane, hexane, octane; cycloaliphatic hydrocarbons such as cyclohexane, cycloheptane; aromatic hydrocarbons such as benzene, toluene, xylene; ethers such as diethyl ether, dibutyl ether, amyl ether; and halogenated hydrocarbons such as carbon tetrachloride, chloroform, and dichlormethane. Such solvents can be employed either alone or in any suitable combination thereof.

F. Release Coating Formulation

The release coatings of this invention to be applied to the desired substrate are generally formulated according to the proportions given in the recipe below and can be combined in any manner or order sufficient to homogenize the blend.

| Recipe | | |
|---|---|---|
| | Parts, by Wt. | |
| Ingredients | Broad | Preferred |
| A. Low Release Strength Silicone-Based Polymer | | |
| (1) High Wt. Av. Mol. Wt. Polymethyldihydroxysiloxanes | 3 | 3 |
| (2) Low Wt. Av. Mol. Wt. Polymethylhydrosiloxanes | 0.03–0.3 | 0.06–0.15 |
| B. High Release Strength Silicone-Based Polymer | 0.1–0.5 | 0.2–0.3 |
| C. Hydroxy Terminated Polymer | 0.01–0.25 | 0.03–0.15 |

-continued

| | Recipe | |
|---|---|---|
| | Parts, by Wt. | |
| Ingredients | Broad | Preferred |
| D. Catalyst | 0.1–0.6 | 0.2–0.5 |
| E. Solvent | 20–200 | 50–80 |

In the above recipe an important feature is the weight ratio of the high release strength silicone-base polymer (ingredient B) to hydroxy terminated polymer (ingredient C). Satisfactory operability is obtained in the present invention by employing the ratios shown as follows:

| | Wt. Ratio of High Release Strength Silicone-Based Polymer Hydroxy-Terminated Polymer |
|---|---|
| Broad Range | 2/1 to 10/1 |
| Preferred Range | 3/1 to 6/1 |

G. Substrates

The compositions of this invention are particularly useful as release coatings for paper and other sheet materials. Examples of suitable substrates include glassine, vegetable parchment, kraft paper, metal foils, plastic films, such as cellophane, polyethylene, polypropylene, vinyl resins, acrylic resins, polyamide resins, and polyester resins. A preferred substrate is corona-treated polyethylene-coated paper.

H. Adhesive

While the release coatings according to this invention applied to the above-described substrates prevent the sticking of practically any sticky material such as tar, asphalt, raw rubber, and the like, this invention is particularly suitable for use with pressure sensitive adhesives such as those based upon natural or synthetic rubbers including styrene-butadiene rubber, ethylene-vinyl acetate copolymers, polyacrylates, and the like.

I. Application

The coating compositions of this invention can be applied to suitable substrates by any conventional coating methods. Such methods include spraying, brushing, rolling, and the like.

The amount of coating composition (excluding solvent) applied to paper or other sheet materials is usually in the range of from 0.1 to 1 pound (45 to 454 gms) per ream of paper (3,000 ft.$^2$ of 280 m$^2$) coated on one side. It is within the scope of this invention, if desired, to coat the substrates on both sides with the inventive coating.

The coating formulations of this invention after being applied to suitable substrates are cured by evaporating the solvent and subjecting the coated substrate to a temperature of 65° C. to 125° C. for a period of time generally less than 1 minute. Of course, the substrate will frequently dictate the temperature employed, for example, lower temperatures will generally be employed with plastic films in order to prevent melting the films.

EXAMPLE

The following inventive and comparative runs demonstrate the preparation of the release paper for potential use with adhesive tape. Release coatings were applied to corona discharge-treated, polyethylene-coated paper to give the desired release paper.

The inventive and comparative release coatings were based upon a commercially available mixture of 97 weight percent high molecular weight polymethyldihydroxysiloxane and 3 weight percent low molecular weight polymethylhydrosiloxane referred herein as low release strength silicone-based polymer (Syl-Off® 23 from Dow Corning Corp.—solution containing 30% solids) and a commercially available catalyst-dibutyltin diacetate (Syl-Off 23A® from Dow Corning Corp.) along with a low molecular weight silicate-derived polymer referred herein as high release strength silicone-based polymer (C4-2109 from Dow Corning Corp.—solution containing 10% solids). The inventive coatings also contained a dihydroxypolybutadiene polymer, 25–26% vinyl unsaturation/5,000 wt. av. molecular weight/80 poise viscosity at 25° C. (Butarez® HT from Phillips Petroleum Company). Several comparative runs were made using various diols.

The coatings were prepared by dissolving the desired ingredients (except catalyst) in n-octane solvent. Catalyst was added just prior to application to paper. The solution (5–10 ml) was evenly distributed over a 22 cm × 28 cm piece of corona-treated polyethylene-coated paper to provide an application rate of about 90 gms per ream (280 m$^2$) of paper. The coated sheets were dried in air at 88° C. for 30 seconds, then allowed to stand 24 hours in air at ambient room temperature prior to testing.

Properties of the release coatings were measured in accordance with procedure RC-283 of the Technical Association of the Pulp and Paper Industry (TAPPI). "Release Force" is defined as the ease (gms/inch of width) with which an adhesive tape is pulled from the coated surface. "Subsequent Adhesion" is defined as the ease (gms/inch of width) with which an adhesive tape is pulled from a metal panel when the adhesive tape was previously contacted with the release coating and, hence, is affected by transfer of the release coating from the paper to the adhesive upon separation thereof. "Subsequent Adhesion" is to be compared with ease of removal from a metal panel of the same adhesive tape which has not contacted the release coating.

In Table I are given the proportions of ingredients and test results for coatings based on 10 parts Syl-Off 23 (referred herein as low release strength silicone-based polymer), 0.4 parts by weight Syl-Off 23A catalyst (dibutyltin diacetate) and varying amounts of C4-2109 (referred herein as high release strength silicone-based polymer) without a poly(butadiene) diol of any type present. Zonas surgical Tape (Johnson & Johnson) was employed.

In Table II are given the proportions of ingredients and test results for coatings based on 10 parts by weight Syl-Off 23, 0.4 parts by weight Syl-Off 23A catalyst, 5.0 parts by weight C4-2109 and 1.0 parts by weight of various poly(butadiene) diol or poly(butadiene/comonomer) diol. Zonas Surgical Tape (Johnson & Johnson) was employed.

In Table III are given the proportions of ingredients and test results for coatings based on 10 parts by weight Syl-Off 23, 0.4 parts by weight Syl-Off 23A, varying amounts of Butarez HT, a poly(butadiene) diol.

TABLE I

Control Runs Without Hydroxy Terminated Polymers

| Components | Parts by Weight | | | | | | | | | | |
|---|---|---|---|---|---|---|---|---|---|---|---|
| Lab Run No: | 262 | 263 | 264 | 265 | 266 | 337 | 338 | 339 | 340 | 341 | 342 |
| 1. Syl-Off 23[a] | 10.0 | 10.0 | 10.0 | 10.0 | 10.0 | 10.0 | 10.0 | 10.0 | 10.0 | 10.0 | 10.0 |
| 2. Syl-Off 23A[b] | 0.4 | 0.4 | 0.4 | 0.4 | 0.4 | 0.4 | 0.4 | 0.4 | 0.4 | 0.4 | 0.4 |
| 3. n-Octane | 58.3 | 61.2 | 62.3 | 64.2 | 67.1 | 58.3 | 61.0 | 62.3 | 64.0 | 67.0 | 69.0 |
| 4. C4-2109[c] | 2.5 | 5.0 | 6.0 | 7.5 | 10.0 | 2.5 | 5.0 | 6.0 | 8.0 | 10.0 | 12.0 |
| Performance: | | | | | | | | | | | |
| 1. Adhesion Control,[d] gms/in. | 557 | 557 | 557 | 557 | 557 | 730 | 730 | 730 | 730 | 730 | 730 |
| 2. Release Force, gms/in | | | | | | | | | | | |
| a. Unrubbed | 64 | 67 | 105 | 135 | 268 | 33 | 70 | 138 | 138 | 208 | 282 |
| b. Rubbed[e] | 130 | 125 | 123 | 127 | 200 | 76 | 137 | 168 | 232 | 223 | 297 |
| c. % Change | 103 | 86 | 17 | −6 | −34 | 130 | 95 | 22 | 68 | 2 | 5 |
| 3. Subsequent Adhesion, gms/in. | 583 | 603 | 607 | 660 | 620 | 753 | 663 | 833 | 563 | 717 | 540 |

[a] Low release strength silicone-based polymer (Dow Corning Corp.)
[b] Catalyst, dibutyltin diacetate (Dow Corning Corp.)
[c] High release strength silicone-based polymer (Dow Corning Corp.), prepared by trimethylsilylating a hydrolyzed sodium silicate, wt. av. MW = 4,000–6,000. Hydroxy content is less than 0.5 wt. % on a solid basis.
[d] Adhesion of tape to steel panel in gms/in.
[e] Rubbed lightly 20 times with paper household tissue prior to release force test to simulate handling.

TABLE II

Runs With Commercial Hydroxy Terminated Polymers

| Components | Parts by Weight | | | | | | |
|---|---|---|---|---|---|---|---|
| Lab Run No: | 263 | 338 | 207 | 208 | 212 | 213 | 214 |
| 1. Syl-Off 23[a] | 10.0 | 10.0 | 10.0 | 10.0 | 10.0 | 10.0 | 10.0 |
| 2. Syl-Off 23A[b] | 0.4 | 0.4 | 0.4 | 0.4 | 0.4 | 0.4 | 0.4 |
| 3. n-Octane | 61.2 | 61.0 | 83.0 | 83.0 | 83.0 | 83.0 | 83.0 |
| 4. C4-2109[c] | 5.0 | 5.0 | 5.0 | 5.0 | 5.0 | 5.0 | 5.0 |
| 5. Diol A[d] | — | — | 1.0 | — | — | — | — |
| 6. Diol B[e] | — | — | — | 1.0 | — | — | — |
| 7. Diol C[f] | — | — | — | — | 1.0 | — | — |
| 8. Diol D[g] | — | — | — | — | — | 1.0 | — |
| 9. Diol E[h] | — | — | — | — | — | — | 1.0 |
| Performance: | | | | | | | |
| 1. Adhesion Control[i], gms/in. | 557 | 730 | 693 | 693 | 693 | 693 | 693 |
| 2. Release Force, gms/in. | | | | | | | |
| a. Unrubbed | 67 | 70 | 300 | 110 | 133 | 150 | 107 |
| b. Rubbed | 125 | 137 | 497 | 423 | 440 | 493 | 232 |
| c. % Change | 86 | 95 | 65 | 284 | 231 | 229 | 116 |
| 3. Subsequent Adhesion, gms/in. | 603 | 663 | 647 | 667 | 723 | 663 | 730 |

[a] Refer footnote, Table I.
[b] Refer footnote, Table I.
[c] Refer footnote, Table I.
[d] Poly(butadiene)diol wt. av. MW 2,800, Scientific Polymer Products, Inc.
[e] Poly(75 wt. % butadiene/25 wt. % styrene) diol, wt. av. MW 3,400, Scientific Polymer Products, Inc.
[f] Poly(butadiene) diol, wt. av. MW 2,800 Arco Chemical Co.
[g] Poly(75 wt. % butadiene/25 wt. % styrene) diol, wt. av. MW 3,400, Arco Chemical Co.
[h] Poly(85 wt. % butadiene/15 wt. % acrylonitrile) diol, wt. av. MW 4,500, Arco Chemical Co.
[i] Adhesion of tape to steel panel in gms/in.
[j] Rubbed lightly 20 times with paper household tissue prior to release force test to simulate handling.

TABLE III

Inventive Runs With Hydroxy Terminated Polymers

| Components | Parts by Weight | | | | | | | | | | | |
|---|---|---|---|---|---|---|---|---|---|---|---|---|
| Lab Run No: | 350 | 351 | 352 | 353 | 354 | 355 | 356 | 474 | 475 | 476 | 477 | 478 |
| 1. Syl-Off 23[a] | 10.0 | 10.0 | 10.0 | 10.0 | 10.0 | 10.0 | 10.0 | 10.0 | 10.0 | 10.0 | 10.0 | 10.0 |
| 2. Syl-Off 23A[b] | 0.4 | 0.4 | 0.4 | 0.4 | 0.4 | 0.4 | 0.4 | 0.4 | 0.4 | 0.4 | 0.4 | 0.4 |
| 3. n-Octane | 61 | 66 | 71 | 76 | 83 | 89 | 109 | 61 | 66 | 71 | 76 | 83 |
| 4. C4-2109[c] | 1 | 2 | 3 | 4 | 5 | 7.5 | 10 | 1 | 2 | 3 | 4 | 5 |
| 5. Butarez HT[d] | 0.2 | 0.4 | 0.6 | 0.8 | 1.0 | 1.2 | 2.0 | 0.2 | 0.4 | 0.6 | 0.8 | 1.0 |
| Performance: | | | | | | | | | | | | |
| 1. Adhesion Control,[e] gms/in. | 647 | 647 | 647 | 647 | 647 | 647 | 647 | 642 | 642 | 642 | 642 | 642 |
| 2. Release Force, gms/in. | | | | | | | | | | | | |
| a. Unrubbed | 38 | 107 | 127 | 68 | 473 | 237 | 437 | 15 | 37 | 103 | 233 | 450 |
| b. Rubbed[f] | 162 | 258 | 383 | 540 | 540 | 547 | 890 | 76 | 363 | 467 | 507 | 607 |
| c. % Change | 326 | 141 | 201 | 664 | 14 | 130 | 103 | 406 | 881 | 353 | 117 | 35 |

TABLE III-continued

| | Inventive Runs With Hydroxy Terminated Polymers | | | | | | | | | | | |
|---|---|---|---|---|---|---|---|---|---|---|---|---|
| Components | Parts by Weight | | | | | | | | | | | |
| Lab Run No: | 350 | 351 | 352 | 353 | 354 | 355 | 356 | 474 | 475 | 476 | 477 | 478 |
| 3. Subsequent Adhesion, gms/in. | 610 | 453 | 660 | 640 | 473 | 683 | 430 | 567 | 547 | 770 | 833 | 417 |

[a]Refer footnote, Table I.
[b]Refer footnote, Table I.
[c]Refer footnote, Table I.
[d]Hydroxy terminated polybutadiene, wt. av. MW 5,000, 25–26% vinyl unsaturation, 80 poise viscosity from Phillips Petroleum Company.
[e]Adhesion of tape to steel panel in gms/in.
[f]Rubbed lightly 20 times with paper household tissue prior to release force test to simulate handling.

Zonas Surgical Tape (Johnson & Johnson) was employed.

The data in Table I shows that only modest release force values can be achieved by the 3-component formulation. Values above 300 gms/inch are not available unless a very large amount of C4-2109 were to be added although such a value was not observed within the limits of the testing. Runs 337-342 were repeated of runs 262-266 except a different adhesion control value was used. Even so, the results were about the same.

The data in Table II shows that higher release force values can be obtained by adding various poly(butadiene) diols. Although the before (adhesion control) and after (subsequent) adhesion was roughly the same there was a large difference between adhesion rubbed and unrubbed.

The data in Table III shows a wide range of release force values varying from 38 gms/in (Run 350) to 473 gms/in (Run 354) which can allow a manufactureer a bigger selection of release force values hence possible use in a wider range of applications. The % change between rubbed and unrubbed is greater at the lower C4-2109/Butarez HT levels and decreases as the concentration of this mixture increases. Runs 474 to 478 were made at a different adhesion control level but show similar results.

TABLE IV

| | Summary of Data | | | | |
|---|---|---|---|---|---|
| Components | Parts by Weight | | | | |
| Lab Run No: | 263 | 338 | 207 | 354 | 478 |
| 1. Syl-Off 23[a] | 10.0 | 10.0 | 10.0 | 10.0 | 10.0 |
| 2. Syl-Off 23A[b] | 0.4 | 0.4 | 0.4 | 0.4 | 0.4 |
| 3. n-Octane | 61.2 | 61.0 | 83.0 | 83.0 | 83.0 |
| 4. C4-2109[c] | 5.0 | 5.0 | 5.0 | 5.0 | 5.0 |
| 5. Diol A[d] | — | — | 1.0 | — | — |
| 6. Butarez HT[e] | — | — | — | 1.0 | 1.0 |
| Performance: | | | | | |
| 1. Adhesion Control[f], gms/in. | 557 | 730 | 693 | 647 | 642 |
| 2. Release Force, gms/in. | | | | | |
| a. Unrubbed | 67 | 70 | 300 | 473 | 450 |
| b. Rubbed[g] | 125 | 137 | 497 | 540 | 607 |
| c. % Change | 86 | 95 | 65 | 14 | 35 |
| 3. Subsequent Adhesion, gms/in. | 603 | 663 | 647 | 473 | 417 |

[a]Refer footnote, Table I.
[b]Refer footnote, Table I.
[c]Refer footnote, Table I.
[d]Poly(butadiene) diol, wt. av. MW 2,800, Scientific Polymer Products, Inc.
[e]Poly(butadiene) diol, wt. av. MW 5,000, Phillips Petroleum Co.
[f]Adhesion of tape to steel panel in gms/in.
[g]Rubbed lightly 20 times with paper household tissue prior to release force test to simulate handling.

A summary of data is shown in Table IV which shows higher release force values with less change between rubbed and unrubbed for the inventive runs, 354 and 478 than when a comparable run (207) was made using another poly(butadiene) diol. Also for comparative purposes are listed two runs (263 and 338) wherein a poly(butadiene) diol is not employed. These later runs have lower release force strengths and larger changes between rubbed and unrubbed values from those of the inventive runs. However, all poly(butadiene) diols, including those commercial diols described herein, are considered within the scope of this invention.

Reasonable variation and modification are possible within the scope of the foregoing disclosure and the appended claims to the invention the essence of which is that a release coating, especially adapted for use with adhesive tapes, has been set forth comprising a low release strength silicone-based polymer, a high release strength silicone-based polymer, a metal salt of a carboxylic acid, and a dihydroxyterminated polymer of a conjugated diene, the amounts of high release strength silicone-based polymer and of the dihydroxyterminated polymer of a conjugated diene, respective to each other, being variable to give varying release force strengths of the final or total release coating composition.

I claim:

1. A release coating composition, suitable for use with adhesive tapes, comprising a low release strength silicone-based polymer, comprised of a mixture of a high weight average molecular weight polymethyldihydroxysiloxane and a low weight average molecular weight polymethylhydrosiloxane, a high release strength silicone-based polymer, obtained by hydrolysis and trimethylsilylation of at least one of an alkali metal silicate and tetraalkyl silicates, a metal salt of a carboxylic acid and a small amount of the order of from about 0.01 to about 0.25 parts by weight of the composition of a dihydroxyterminated polymer of a conjugated diene.

2. A composition according to claim 1 wherein the polymethyldihydroxysiloxane and the polymethylhydrosiloxane are present in the low release strength silicone-based polymer in an amount of from about 90 to about 99 wt. % of the high molecular weight ingredient and 10-1 wt. % of the low molecular weight ingredient.

3. A composition according to claim 1 wherein the high weight average molecular weight polymethyldihydroxysiloxane is represented by the general formula

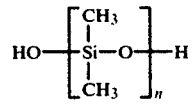

wherein n represents the number of repeating units in the polymer chain and is generally in the range of from about 1,000 to about 5,000 and wherein the low weight average molecular weight polymethylhydrosiloxane is represented by the general formula

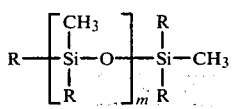

wherein R is hydrogen or a methyl radical, m refers to the number of repeating units in the polymer chain and is generally in the range of from about 25 to about 100 and wherein at least 25% of the R groups are hydrogen with the remainder thereof being methyl radicals.

4. A composition according to claim 1 wherein the dihydroxyterminated polymer of a conjugated diene is at least one of a liquid and semiliquid polymer having weight average molecular weights in the approximate range of from about 1,000 to about 20,000 represented by the general formula

HO—R"—OH wherein R" is derived from polymerization of a conjugated diene.

5. A composition according to claim 1 comprising a catalyst and wherein the ingredients are present in the following approximate ranges

|  | Parts by Weight |
|---|---|
| A. Low Release Strength Silicone-Based Polymer | |
| (1) High Wt. Av. Mol. Wt. Polymethyldihydroxysiloxanes | 3 |
| (2) Low Wt. Av. Mol. Wt. Polymethylhydrosiloxanes | 0.03–0.3 |
| B. High Release Strength Silicone-Based Polymer | 0.1–0.5 |
| C. Hydroxy Terminated Polymer | 0.01–0.25 |
| D. Catalyst | 0.1–0.6 |
| E. Solvent | 20–200 |

6. A composition according to claim 1 comprising a catalyst and wherein the ingredients are present in the following approximate ranges

|  | Parts by Weight |
|---|---|
| A. Low Release Strength Silicone-Based Polymer | |
| (1) High Wt. Av. Mol. Wt. Polymethyldihydroxysiloxane | 3 |
| (2) Low Wt. Av. Mol. Wt. Polymethylhydrosiloxanes | 0.06–0.15 |
| B. High Release Strength Silicone-Based Polymer | 0.2–0.3 |
| C. Hydroxy Terminated Polymer | 0.03–0.15 |
| D. Catalyst | 0.2–0.5 |
| E. Solvent | 50–80 |

7. A composition according to claim 1 wherein a catalyst employed is a metal salt of a carboxylic acid suitable to crosslink the polymethylhydrosiloxane and the dihydroxyterminated polymer of a conjugated diene.

8. A composition according to claim 7 wherein the metal is selected from at least one of the following lead, tin, nickel, cobalt, iron, cadmium, chromium, and zinc.

9. A composition according to claim 8 wherein the metal is tin.

10. A composition according to claim 1 wherein a catalyst employed is selected from the following dibutyltin diacetate, dibutylin dilaurate, dibutyltin di-(2-ethylhexanoate), dioctyltin diacetate, tributyltin acetate, dioctyltin maleate, cobalt naphthenate, and chromium octanoate.

11. A composition according to claim 1 wherein a catalyst employed is dibutyltin diacetate.

12. A composition according to claim 1 wherein the low release strength silicone-based polymer is a mixture of about from 90 to 99 wt. % of a high weight average molecular weight polymethyldihydroxysiloxane which is a substantially linear dimethylsiloxane polymer in which the terminal silicon atoms of the polymer's molecules have directly attached thereto hydroxy radicals and about 10-1 wt. % of a low weight average molecular weight polymethylhydrosiloxane which is a substantially linear siloxane polymer in which some of the silicon atoms have hydrogen atoms bonded thereto, the remaining valencies of the silicon atoms being satisfied with methyl radicals with oxygen atoms forming the —OSiOSiOSi—linkages within the siloxane chain; a high release silicone-based polymer is obtained by hydrolysis and trimethylsilylation of at least one of an alkali metal silicate and tetraalkyl silicate and there is effected the co-hydrolysis of trimethylchlorsilane and tetraalkyl silicate in a suitable solvent to effect desired hydrolysis and co-condensation by adding aqueous acid to the mixture thus obtained, in one embodiment.

13. A composition according to claim 1 wherein the weight ratio of high release strength silicone-based polymer to hydroxy terminated polymer is in the approximate range of from 2 to 1 to 10 to 1.

* * * * *